United States Patent

[11] 3,615,830

| [72] | Inventor | Daniel Hiram Johnson |
| | | Parma Heights, Ohio |
| [21] | Appl. No. | 849,913 |
| [22] | Filed | Aug. 13, 1969 |
| [45] | Patented | Oct. 26, 1971 |
| [73] | Assignee | Union Carbide Corporation |
| | | New York, N.Y. |

[54] ZINC ADDITIVE IN NICKEL CADMIUM CELLS
10 Claims, No Drawings

[52] U.S. Cl........................................................ 136/6, 136/24, 136/28
[51] Int. Cl. ............................................... H01m 35/00, H01m 43/04
[50] Field of Search............................................. 136/24, 28–29, 30, 6, 9, 20, 19, 68, 154, 31, 83, 102–105

[56] References Cited
UNITED STATES PATENTS

| 2,662,928 | 12/1953 | Brennan | 136/24 |
| 2,905,739 | 9/1959 | Strauss | 136/6 |
| 2,915,576 | 12/1959 | Strauss | 136/9 |
| 2,945,078 | 7/1960 | Chapman et al. | 136/20 |
| 2,980,747 | 4/1961 | Daley | 136/6 |
| 3,048,644 | 8/1962 | Euler | 136/83 |
| 3,208,880 | 9/1965 | Bode | 136/24 |
| 3,228,795 | 1/1966 | Ackermann | 136/29 |

*Primary Examiner*—Winston A. Douglas
*Assistant Examiner*—A. Skapars
*Attorneys*—Paul A. Rose, John F. Hohmann, John R. Doherty and Michael A. Caputo

ABSTRACT: Improvement in the operating characteristics of nickel cadmium cells is effected by presence of zinc in the positive electrode thereof in an amount exceeding the amount of zinc which would be required to saturate the electrolyte of the cell.

ZINC ADDITIVE IN NICKEL CADMIUM CELLS

The present invention relates to the manufacture of nickel cadmium secondary batteries and, more particularly to means for improving the operating characteristics thereof.

Nickel cadmium batteries are important power sources providing a highly convenient, widely used energy device utilizing one of the best electrochemical systems known. Batteries of this type are normally sealed and may be utilized without complicated routine maintenance. The cells may be recharged many times and they provide a relatively constant output potential during discharge. Furthermore, this type of cell is quite competitive with other types of systems in terms of cost per hour of use, and it is one of the most important commercially available secondary battery systems in use today. Portable devices of many types requiring greater energy than would be economically available from primary batteries have become practical to a large degree due to the availability of a secondary battery system such as the nickel cadmium system. Accordingly, it will be appreciated that any significant improvement in the nickel cadmium system could provide enhanced utility to an already estimable battery device.

Some of the more important operating characteristics of any storage battery system are charge retention and charge acceptance. The ability to retain charge for longer periods will expand and extend the useful life of a battery, particularly where long periods of inactive on-shelf storage may be required. Charge acceptance capability may vary depending upon operating circumstances, and any limitation as to the environment within which charge acceptance may be impaired would necessarily diminish the applicability of a battery system. For example, impaired charge acceptance capability at certain temperature levels could be a disadvantage of significance with regard to secondary battery systems. Therefore, it will be recognized that any appreciable improvement in these characteristics with respect to nickel cadmium batteries would involve an achievement of significant value and importance.

Accordingly, it is an object of the present invention to provide an improved nickel cadmium cell featuring better charge-retention characteristics and enchanced charge acceptance capability particularly at elevated temperatures.

Basically, nickel hydroxide cadmium cells comprise a nickel cathode and metallic cadmium anode, with an alkaline electrolyte which consists of an aqueous solution of potassium hydroxide. It has been discovered, in accordance with the present invention, that the presence of zinc in the nickel cathode in quantities exceeding a specified minimum level will produce an improvement in the operating characteristics of a nickel cadmium cell. More specifically, when zinc is present in the cathode of a nickel cadmium cell in quantities in excess of the quantity of zinc which would be required to saturate the electrolyte of the cell, there has been observed an improvement in charge retention by the cell as well as in its charge acceptance capability particularly at elevated temperatures. This improvement was achieved by adding zinc directly to the cell during the manufacturing procedure. It was found that zinc could be added either directly to the cathode or to the electrolyte, or to both, and that after cycling a certain portion of the zinc added would migrate to and/or remain in the cathode. If the quantity of zinc in the cathode was above the minimum quantities specified herein, i.e. in excess of the quantity required to saturate the cell electrolyte, significant improvements in charge retention and charge acceptance particularly at elevated temperatures were observed regardless of the manner of zinc addition. However, although the resulting benefits in operating characteristics were observed without regard to the manner and location of initial placement of the zinc, certain other limitations and problems, to be discussed in more detail hereinafter, relating to achievement of zinc presence in the cathode in sufficient minimum quantities were encountered when the zinc was added in a manner other than by direct placement into the cathode during manufacture of the cell.

Briefly, therefore, the present invention may be defined as comprising a nickel cadmium cell having zinc in the positive electrode thereof in a quantity in excess of the quantity which would be required to saturate the electrolyte of the cell.

By a further aspect of the invention, zinc is introduced into a nickel cadmium cell by a method which comprises placement of the zinc directly into either the positive electrode or the electrolyte of the cell, or both, during the manufacture thereof, the preferred method being placement of the zinc directly into the positive electrode.

In the practice of he present invention, nickel cadmium batteries may be constructed utilizing many known manufacturing techniques and ingredients, with the added requirement that a certain specified quantity of zinc be added to the battery in the manner set forth. For example, the types of cells wherein the benefits described herein will be observed if zinc is appropriately incorporated into the positive electrode may include cells utilizing electrodes of the sintered type or electrodes of the pressed-powder type. As is generally known, sintered electrodes are those types of electrodes which comprise a sintered substrate impregnated with and holding the active electrode material. In the work resulting in the present invention, it was observed that the zinc quantities of the invention could more readily be placed and retained in a positive electrode of the pressed-powder type than in a sintered electrode.

A battery utilizing the principles of the present invention and including electrodes of the pressed-powder type may be manufactured in accordance with know techniques. Of course, in order to produce the benefits of the invention zinc must be added in the particular quantities and in the manner specified herein.

Pressed-powder electrodes of nickel cadmium batteries made therefor by one known exemplary method from a powdered active mass pressed into an expanded metal grid, the powdered active mass being substantially contained within the openings of the metal grid. When the electrodes are placed within the cell, they are positioned relative to each other with a separator, which is resistant to electrolyte deterioration, interposed between the electrodes and in physical contact therewith. An electrolyte, which is potassium hydroxide in water solution, is present in the cell and is held substantially absorbed within the pressed-powder electrodes and within the separator. Within the cell, the positive electrode is always maintained under pressure due to compression within the cell. This is due to the fact that when electrolyte is added to the cell, and during charging of the cell, the positive electrode tends to swell and to reject some of the active material from within the metal grid. Accordingly, when electrolyte is added, and during life of the cell, the positive electrode must be held in a restrained condition. A pressure of at least 300 p.s.i. but not in excess of about 700 p.s.i. is sufficient. A preferred pressure range is from 400 to about 500 p.s.i.

The expanded metal grid of the electrodes of a cell will usually comprise a plurality of metal strands integrally joined at various junctures of the strands. However, a grid having a honeycomb structure may be utilized. The essential requirements of the metal grid is that it contain "pockets" or openings capable of receiving the powdered active mass which comprises the electrodes and that it be capable of retaining this active mass within the openings once pressure is applied to the grid within the cell. The grid must be an electrical conductor since it operates as an internal current collector for the electrode. Many types of metal may be employed in forming the metal grid so long as the metal is relatively inert with regard to the normal chemical and electrochemical reactions which occur within the cell. For example, steel and nickel are commonly employed as materials of construction in a cadmium system. Since conditions prevalent at the cadmium electrode comprise primarily a reduction environment, the selection of metal used for the grid of the negative electrode is less critical than for the nickel cathode or positive electrode. At the positive electrode, a more oxidation-resistant material is preferred. Typical of such materials utilized for the metal grid of the cathode are nickel or nickel-coated steel.

In addition, the positive electrode may usually contain what is referred to as an antipolar mass which serves to prevent hydrogen generation at the positive electrode in the event of a polarity reversal within the cell which would occur when the cell is overdischarged. The antipolar mass does not disturb the function of the positive active mass during normal charging and discharging of the cell. The exact amount of antipolar mass present in the positive electrode may vary and is dependent primarily upon the type of service to which the cell will be subjected. In a nickel cadmium secondary cell cadmium oxide or cadmium hydroxide is normally employed as the antipolar mass.

In the manufacture of nickel cadmium secondary cells in accordance with the present invention, the inclusion in the positive electrode of an antipolar mass is an optional consideration. Test results indicate that the benefits of the invention are obtainable with or without the addition of an antipolar mass and that the absence or presence thereof will have no affect upon the manner whereby the zinc presence in the positive electrode will improve the operating characteristics of the cell.

In a specific embodiment of the invention, a positive electrode may be manufactured by mixing together in a mulling type mixer for 15 minutes a positive mass consisting of dry powders of nickelic hydroxide, cadmium oxide, zinc powder, graphite and polyacrylic plastic fiber. After mixing, the mix is given a single pass through a pulverizer.

An example of a suitable formula which may be utilized in the manufacture of the positive electrode is as follows:

| Ingredients | Percent by weight |
|---|---|
| Ni(OH)$_2$ | 62.00 |
| graphite | 18.60 |
| CdO | 11.90 |
| Zn | 4.90 |
| Dynel | 0.60 |
| H$_2$O | 2.00 |

This formula may be varied depending upon the requirements of performance of a particular cell. The zinc which is included in the positive mix in accordance with the specific example set forth above may be in the form of zinc powder or it may be added in the form of zinc oxide. Additionally, as previously discussed, the antipolar mass of cadmium oxide included in the above mix formula may be excluded without significantly detracting from the performance of the zinc presence in the cell. The mix formula set forth above represents ingredients normally included in the manufacture of a positive electrode for a nickel cadmium cell with the exception of the zinc, which is added in accordance with the teachings of the present invention.

After appropriate mixing, the positive electrode is manufactured by passing in a continuous manner the positive mass and an expanded metal carrier grid in a vertical downward direction between the 14 inches diameter by 30 inches long horizontal rolls of a conventional two-roll mill of the type used in powder metallurgy. The expanded metal grid may be manufactured in accordance with known techniques, and when inserted between the horizontal rolls the grid lays curved against the upper surface on one roll and may be held under tension which is not great enough to deform it. The positive mass is metered into the roll gap beside the metal grid in such a manner as to fill uniformly the multitude of small openings of the carrier. The carried grid and the positive mass are thus packed together as they pass between the horizontal rolls to form the finished electrode. A more detailed description of the manner in which this procedure may be performed is found in U.S. Pat. No. X3,310,437 to R. L. Davee et al., which describes an apparatus and method for manufacturing pressed powder electrodes.

The spacing between the mill rolls is adjusted to compact the positive mass into the carrier grid with an appropriate finished thickness after roll milling. A packing of the active mass is obtained by compacting during this procedure, and the thickness of the metal grid is reduced due to bending over of the strands of the carrier thereby to effectively lock in place the positive mass.

The negative electrode may be manufactured in much the same manner as that described above in connection with the positive electrode, except that the space between the mill rolls is adjusted to compact the negative mass in the carrier grid to a slightly different overall thickness.

An example of a suitable formula for a negative mass is as follows:

| Ingredients | Percent by weight |
|---|---|
| CdO | 86.09 |
| Ni | 13.38 |
| Dynel | 0.53 |

The above-cited mix formula is in accordance with commonly known principles and the relative percentages may be varied in a manner well known to those skilled in the art without affecting the practice of the present invention.

Cells constructed in accordance with the present invention were tested and the results of those tests are set forth in table 1 below.

TABLE I

| | | | Charge retention* | | | |
|---|---|---|---|---|---|---|
| Cell | Z factor | Charge* acceptance at 115 °F. | 1 week at 115 °F. | 2 weeks at 115 °F. | 3 weeks at 115 °F. | 4 weeks at 115 °F. |
| I | 0 | 50.0 | 47.5 | 40.0 | 10.0 | 0.0 |
| II | 0.80 | 70.6 | 63.5 | 42.0 | 12.5 | 0.0 |
| III | 1.10 | 83.0 | 72.0 | 46.0 | na | na |
| IV | 1.75 | 85.0 | 73.0 | 59.0 | 52.5 | 39.5 |
| V | 2.10 | 78.0 | 76.5 | 67.5 | 57.0 | 37.5 |
| VI | 2.21 | 76.0 | 77.5 | 67.0 | 58.3 | 52.0 |
| VII | 2.40 | 83.5 | 76.5 | 65.0 | 63.5 | 43.0 |

*Values in ampere hours percentage of nominal capacity.

$$Z = \frac{\text{Quantity of zinc present in the positive electrode}}{\text{Quantity of zinc required to saturate cell electrolyte at 75 °F}}$$

na—No data available.

In table 1, entries are included for seven exemplary cells identified as Cells I–VII. This data was accumulated by averaging test results from a great number of cells, and is should be understood that each cell number I–VII does not represent a single test cell but rather is an exemplary representation of a large number of test cells the data from which has been accumulated and averaged to provide the entries set forth. The Z factor set forth represents the actual quantity of zinc present in the positive electrodes of a cell after the cell has been charged and discharged several times. This quantity of zinc is defined in terms of the quantity of zinc which would be required to saturate the cell electrolyte due to the fact that it was discovered, in accordance with the present invention, that zinc in the positive electrode begins to produce significant benefits when it is present in the positive electrode in quantities exceeding the quantity of zinc which would be required to saturate the cell electrolyte.

It should be understood that it is not herein intended to imply that in order to achieve the benefits of the present invention in a particular nickel cadmium cell the electrolyte actually present in this cell must be saturated with zinc. Rather, the electrolyte saturation level is utilized in defining the minimum level of zinc present in the positive electrode which will produce the benefits of the invention. Also, it should be understood that the electrolyte saturation level referred to herein is taken at room temperature of 75° F.

From table 1 above, it will be shown that the charge acceptance of the cell at 115° F. is improved by the presence of zinc in the positive electrode, and that this improvement commences in a significant way at approximately a Z Factor of 1. Cell I represents a cell wherein no zinc was present in the positive electrode. It will be seen that as the level of quantity of zinc present in the positive electrode is increased to approximately the point where Z equals 1, the ability of the cell to accept charge at the elevated temperature of 115° F. improves and remains at a fairly high level for increased quantities of zinc above Z equals 1. Likewise, the ability of the cell to retain its charge is significantly improved. Table 1 sets forth data for cells tested for periods of 1, 2, 3 and 4 weeks at 155° F. for charge retention. Again, the data will show that the ability of the cell to retain its charge, especially after longer periods of time and at temperatures above room temperature, is significantly enhanced by the presence of zinc in the positive electrode in quantities above Z equals 1.

It should be understood that the data set forth in table 1 is not intended to verify an exact relationship existing between the degree to which charge acceptance and retention is improved and the specific quantities of zinc in the positive electrode above Z equals 1. That is, no data was accumulated to determine the existence of any consistent relationship between Z Factors above 1 and charge acceptance or charge retention. Also, any such relationship, or lack thereof, which may be indicated in the entries set forth should be considered together with the fact that the entries represent average quantities and may be influenced by factors having no bearing upon quantity of zinc present.

Furthermore, the Cells I-VII of table 1 represent examples of cells wherein factors other than the zinc content were varied to determine whether the benefits of the invention could be achieved in different types of nickel cadmium cells comprising differing ingredients in varying proportions. For example, some of the cells exemplified in table 1 contained an antipolar mass of cadmium oxide while some did not. Also, the mix formulas for the positive and negative electrodes were varied and they did not in all cases correspond with regard to percent by weight ratios, the specific per cent by weight ratios set forth hereinbefore being one specific embodiment which may be appropriately utilized. A certain margin of error must be considered in evaluating the pattern of the data set forth, and there must also be considered the possibility that other unintentional variations in the testing procedure may have insignificantly affected the outcome of the tests in a manner having no bearing upon the effects produced exclusively by the inclusion of zinc in accordance with the present invention.

In the test cells of table 1, two volumes of electrolyte were utilized. Therefore, two differing minimum quantities of zinc in the positive electrode in accordance with the present invention were involved. In one case, 3.6 cc. of 32 percent KOH aqueous solution requiring 176 milligrams of zinc for saturation was used, and in a second group of test cells 4.2 cc. of 32 percent KOH aqueous solution requiring 205 mg. of zinc for saturation was used. It will be apparent that given the volume and concentration of the electrolyte of a cell and thus knowing the amount of zinc required for saturation of that electrolyte, there can be derived from the Z Factor of table 1 the total quantity of zinc present in the positive electrode of a cell. For example, in table 1, Cell V has a Z Factor of 2.10. Assuming a electrolyte concentration of 3.6 cc. of 32 percent KOH aqueous solution, it will be seen that a total mg. of zinc in the positive of 370 mg. can be derived by multiplying the Z Factor by 176 mg. which is the quantity of zinc required for electrolyte saturation.

As previously pointed out, not all of the zinc present within the cell will be found within the positive electrode after the cell has been cycled. Test cells examined and analyzed after cycling were found to contain approximately 75 to 80 percent of the total cell zinc in the positive electrode. The percentage of the total cell zinc found in the positive electrode varied somewhat depending upon whether the analyzed cell was in the charged or discharged condition. When the cells were analyzed while in the charge condition, about 80 percent of the total zinc was found to be in the positive electrode, whereas cells analyzed in he discharged condition indicated approximately 75 percent of the total zinc to be in the positive electrode. The balance of the zinc in the cell was found either in the negative electrode or in the separator and for the purposes of the present invention, and at optimum levels of zinc addition, the relative proportions of zinc in the separator and/or negative electrode were not found to be significant. Specific examples of cells where the relative proportion of zinc were as indicated above are cells V, VI and VII in table 1. The total quantities of zinc present in these cells varied from between 460 to 560 mg. while the quantities of zinc present in the positive electrode varied from between 344 to 462 mg. Thus, it will be apparent that at these levels of zinc addition it will be necessary to introduce into the cell a total quantity of zinc which will be approximately 1.3 times the quantity of zinc required in the positive electrode to produce the benefits of the present invention. For example, in a cell utilizing 3.6 cc. of 32 percent KOH aqueous solution as the electrolyte and utilizing a Z Factor of 2.3 it would be necessary to introduce into the cell during the manufacturing procedures approximately 530 mg. of zinc.

An additional factor of significant importance is the location at which the zinc is initially introduced into the cell. In the examples discussed above, the zinc is introduced directly into the positive electrode during the manufacture thereof. However, it is possible, although not preferred, to also introduce zinc into the electrolyte. The basic and most important difference between the introduction of zinc directly into the positive electrode and introduction of zinc in the electrolyte, or other portions of the cell, relates to the fact that a greater percentage of the total amount of zinc introduced into the cell will remain in the positive electrode if the zinc is initially directly placed in the positive electrode mix, in the manner herein previously described. For example, in situations where zinc was initially introduced into the electrolyte in quantities of approximately 850 mg. it was found that after cycling only about 42 percent of this zinc was retained in the positive electrode with the greatest quantity of zinc remaining in the cell separator.

Placement of zinc initially directly into the negative electrode was found to be unacceptable in terms of the ultimate overall results achieved. Although some of the zinc placed in the negative electrode will ultimately find its way to the positive electrode, in order to achieve levels of zinc presence in the positive electrode sufficient to produce the benefits of the present invention it was required to initially place in the negative electrode quantities of zinc at such high levels that cell bulging and leakage occurred. Although the phenomenon whereby this occurred is not completely understood, it is believed that the bulging and leakage, which was caused by excessive internal cell pressure, was created by poor recombination in the negative electrode of oxygen which is evolved at the positive electrode.

An additional factor which was observed is that the total percentage of zinc remaining in the positive electrode after cycling appears to decrease with increasing levels of zinc addition irrespective of the location at which the zinc is initially introduced. Accordingly, assuming that all of the zinc initially introduced into the cell is introduced by placing it directly into the positive electrode during manufacture, which is the preferred method of the present invention, it would be found that as the total quantity of zinc initially introduced increases the percentage of zinc remaining in the positive electrode will decrease. Thus, it appears that for optimum levels of performance a Z Factor range of between 1.10 and 3.50 should be maintained with the preferred level being at Z equals 2.30.

The factors which are to be considered in determining optimum levels of zinc addition, relate to cell volume and/or positive electrode capacity. It will be clear that as the quantity of zinc introduced into the positive electrode increases, one of two factors must change in order to accommodate this increased zinc presence. If zinc is added without diminishing the quantity of nickel present in the electrode, then cell volume must necessarily increase. On the other hand, if the zinc is introduced at the expense of decreasing the quantity of nickel in the positive electrode with cell volume being maintained constant, then the nominal capacity of the cell would necessarily be decreased.

In considering optimum results in the practice of the present invention, it was found that zinc presence in the positive electrode produced benefits which commenced to become substantial at levels of zinc presence of about Z equals 1, with the benefits increasing as the Z Factor increased up to a certain level whereat increasing the Z Factor produced increased benefits at a much slower rate. That is, at levels of Z Factor above about 3.50 the benefits to be derived from zinc presence in a positive electrode tend to level off with greater increases in zinc quantity producing a lessened degree of beneficial results. Although no maximum zinc level, at which no improved beneficial results were achieved with increased zinc quantity in the positive electrode, was observed, it would appear that the quantity of zinc introduced into a cell at higher levels of zinc addition would be limited primarily by the practical effects of increased cell volume produced by the added zinc. It would seem that a level would be reached where the disadvantages of increasing the cell volume to accommodate the added quantities of zinc would offset the benefit to be derived from the added quantities of zinc. Of course, it must be assumed that a certain minimum capacity level is maintained by retaining a given minimum amount of nickel in the positive electrode. In any event, the degree to which other disadvantages may become acceptable in order to achieve additional levels of beneficial results from increased zinc presence in positive electrodes will vary and depend upon particular applications involved. For example, inasmuch as one of the important advantages produced by the present invention is charge retention, it may be that for particular applications longer term shelf life would be of sufficient importance to warrant sacrificing either battery size or battery nominal capacity. In such case it may be desirable to achieve additional shelf life by increasing the amount of zinc in the positive electrode while sacrificing other less important perameters.

In summary, it will be clear that zinc presence in the positive electrode of the nickel cadmium cell in the stated quantities will provide improved charge retention and high-temperature charge acceptance. These benefits may be achieved with various methods of zinc addition. For example, the zinc may be added directly to the positive electrode either in the form of zinc powder or as zinc oxide or it may be added by forming a mixture of the potassium hydroxide electrolyte with appropriate quantities of zinc in the form of zinc oxide which are then added to the cell. The benefits of the invention were observed in cells both with and without an antipolar mass of cadmium oxide. Accordingly, it would seem that zinc may be added to the cell during the manufacture thereof in a variety off form and by a variety of methods while continuing to achieve the benefits indicated herein. However, addition of zinc directly to the positive electrode mass is the preferred and the most generally satisfactory method of zinc addition. Most importantly, it will be seen that the addition of zinc to the positive electrode below amounts equivalent to the amount of zinc which would be required to saturate the electrolyte of the cell provide little or no beneficial effect, with the significant improvements of the present invention resulting only with zinc presence in the positive electrode in excess of this saturation amount.

What is claimed is:

1. In a nickel cadmium storage battery comprising nickel hydroxide positive electrode, a cadmium negative electrode and an alkaline electrolyte the improvement comprising presence of zinc in said positive electrode in the range between 1.10 and about 3.50 times the quantity of zinc required to saturate said electrolyte after cycling of said battery.

2. A storage battery according to claim 1 comprising a quantity of zinc in said positive electrode equivalent to approximately 2.30 times the quantity of zinc required to saturate said electrolyte.

3. A storage battery according to claim 1 wherein said positive electrode comprises powders of nickel hydroxide and powders of a material selected from the group consisting of metallic zinc and zinc oxide pressed into the openings of a metallic grid.

4. A storage battery according to claim 3 comprising a quantity of zinc in said positive electrode in the range between 1.10 and 3.50 times the quantity of zinc be required to saturate said electrolyte.

5. A storage battery according to claim 3 comprising a quantity of zinc in said positive electrode equivalent to approximately 2.30 times the quantity of zinc required to saturate said electrolyte.

6. A storage battery according to claim 3 wherein said positive electrode comprises antipolar material.

7. A storage battery according to claim 6 wherein said antipolar material is cadmium oxide.

8. In an uncharged nickel cadmium storage battery comprising nickel hydroxide positive electrode, a cadmium hydroxide negative electrode and an alkaline electrolyte, said positive electrode comprising a quantity of zinc in the range between 1.10 and about 1.35 times the quantity of zinc required to saturate said electrolyte after cycling of said battery.

9. An uncharged storage battery according to claim 8 wherein said quantity of zinc within the positive electrode is equivalent to about 1.10 times the quantity of zinc required to saturate said electrolyte after cycling of said battery.

10. An uncharged storage battery according to claim 8 wherein said quantity of zinc is approximately 1.30 times the quantity of zinc required to saturate said electrolyte after cycling of said battery.

* * * * *